(12) United States Patent
Hoffmann et al.

(10) Patent No.: US 6,698,303 B2
(45) Date of Patent: Mar. 2, 2004

(54) AUTOMATED GEAR DRIVE DEVICE, IN PARTICULAR FOR MOTOR VEHICLE

(75) Inventors: Christian Hoffmann, Paris (FR); Pascal Thery, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/959,452

(22) PCT Filed: Feb. 28, 2001

(86) PCT No.: PCT/FR01/00592

§ 371 (c)(1),
(2), (4) Date: Oct. 26, 2001

(87) PCT Pub. No.: WO01/65152

PCT Pub. Date: Sep. 7, 2001

(65) Prior Publication Data

US 2003/0047026 A1 Mar. 13, 2003

(30) Foreign Application Priority Data

Feb. 28, 2000 (FR) .............................................. 00 02482

(51) Int. Cl.⁷ ............................. F16H 63/18; F16D 41/07
(52) U.S. Cl. ..................... 74/337.5; 74/333; 74/336 R; 192/20; 192/45.1
(58) Field of Search .......................... 74/325, 333, 335, 74/336 R, 337.5; 192/20, 45.1, 76

(56) References Cited

U.S. PATENT DOCUMENTS

| | | | |
|---|---|---|---|
| 1,223,862 A | * | 4/1917 | Eaton .......................... 74/375 |
| 1,564,667 A | * | 12/1925 | Guild .......................... 74/333 |
| 2,377,575 A | * | 6/1945 | Ringer ....................... 192/20 X |
| 3,890,850 A | * | 6/1975 | Hauser et al. ................ 74/372 |
| 4,301,690 A | | 11/1981 | Cavenagh |
| 4,987,790 A | * | 1/1991 | Weismann .................... 74/333 |
| 5,131,285 A | * | 7/1992 | Weismann et al. ............ 74/333 |
| 5,301,565 A | * | 4/1994 | Weismann et al. ........ 74/336 R |
| 5,553,510 A | * | 9/1996 | Balhorn ................. 74/337.5 X |

FOREIGN PATENT DOCUMENTS

| | | | |
|---|---|---|---|
| DE | 2351228 | * | 4/1975 |
| EP | 0 391 604 A | | 10/1990 |
| EP | 0 462 904 A | | 12/1991 |
| GB | 2259337 | * | 3/1993 |
| WO | WO 91/06788 | * | 5/1991 |

* cited by examiner

Primary Examiner—Ha Ho
(74) Attorney, Agent, or Firm—Liniak, Berenato & White (57) ABSTRACT

An automated gear drive, comprising two main gearshafts (18, 20) bearing drive pinions (22, 24) and linked each by a clutch (E1, E2) to a clutch shaft (10), a gearbox output shaft (12) bearing driven pinions (26) each of which is associated with one-way locking device (28) controlled to be selectively interlocked with the gearbox output shaft (12), the one-way locking device (28) being controlled by mechanical device (30, 32, 34) common to all the loose pinions (26) of the different gear ratios. The automated gear drive enables in particular gear ratio shift with uninterrupted torque transmission to the gearbox output shaft (12).

31 Claims, 11 Drawing Sheets

| $A_N$ | 1 | 1 | 0 |
|---|---|---|---|
| $B_N$ | 1 | 0 | 0 |
| $A_{N+1}$ | 0 | 1 | 1 |
| $B_{N+1}$ | 0 | 0 | 1 |

Fig. 7

| $A_N$ | 1 | 1 | 0 |
|---|---|---|---|
| $B_N$ | 1 | 0 | 0 |
| $A_{N-1}$ | 0 | 1 | 1 |
| $B_{N-1}$ | 0 | 0 | 1 |

AUTOMATED GEAR DRIVE DEVICE, IN PARTICULAR FOR MOTOR VEHICLE

BACKGROUND OF THE INVENTION

1. Field of the Invention

This invention relates to an automatic gear-type transmission apparatus, in particular for a motor vehicle, for changing transmission ratio without interrupting the transmission of a rotational torque between an engine shaft and a driven shaft.

2. Description of Related Art

A gear-type automatic transmission has been proposed in the past, which is equipped with a double clutch that couples the output shaft of an internal combustion engine to two input shafts of the transmission, one of which carries driving pinions for the first, third and fifth transmission ratios, while the other one carries the driving pinions for the second and fourth, and for the sixth if any, transmission ratios, while the driven pinions for these ratios are mounted for free rotation on an output shaft of the transmission and are in constant engagement with the corresponding driving pinions. Synchromesh means are associated with the driven pinions for coupling them selectively with the output shaft.

In this known apparatus, when a transmission ratio is engaged, the clutch mounted on the input shaft carrying the driving pinion for that transmission ratio is engaged, and the clutch mounted on the other input shaft is disengaged. In order to change from a first transmission ratio to a second transmission ratio it is necessary to carry out an initial preselection operation, by coupling the driven pinion for the second ratio to its shaft by a synchronisation step followed by a meshing step. In a second operation, the two clutches must be controlled together so as simultaneously and progressively to reduce the torque transmitted by the clutch of the first transmission ratio, and to increase the torque transmitted through the clutch of the second transmission ratio, which corresponds to "hunting" of the clutches.

To this end, it is necessary to provide means for real-time measurement of the velocities or accelerations of the shafts. A computer receives the output signals from these measuring means and produces control signals for rapid actuators of the clutches and synchromesh means, and the duration of a change of ratio must be less than 0.5 to 1 second approximately according to circumstances, and cannot be too short (which would present problems of energy transfer), or too long (which would cause prolonged slipping of the clutches and absorption of energy).

SUMMARY OF THE INVENTION

A main object of the invention is to avoid these drawbacks in an automatic gear-type transmission.

To this end, it proposes an automatic gear-type transmission apparatus, in particular for a motor vehicle, adapted to couple an engine shaft and a driven shaft together, and comprising at least one input shaft, at least one clutch arranged between the engine shaft and the output shaft, driving pinions mounted on the said input shaft and driven pinions mounted on the driven shaft, each driven pinion being in constant engagement with a driving pinion and defining a transmission ratio, one of the pinions for each ratio being fixed to the shaft on which it is mounted while the other pinion for the said ratio is freely rotatable on its shaft, and means for selectively coupling each free pinion fixedly with the shaft on which it is mounted, for engagement of the corresponding transmission ratio, characterised in that it has two input shafts and two clutches, each of which couples one input shaft to the engine shaft, with each input shaft carrying at least one driving pinion, and in that the selective coupling means comprise, for at least one free pinion, two controlled one-way lock-up mechanisms, mounted in opposition to each other between the free pinion and its shaft, and each able to occupy two positions, namely a rest position and a working position in which one of the mechanisms prevents the pinion rotating faster than its shaft, while the other one prevents the pinion rotating more slowly than its shaft, and mechanical means for actuating the lock-up mechanisms, the said actuating means comprising cams which are displaceable in straight line motion and/or in rotation.

The use of cams for control of the one-way lock-up mechanisms of the free pinions offers the advantage of positive control, guaranteeing actuation of the mechanisms by the displacement of the cams.

According to another feature of the invention, the apparatus comprises means for controlling the said clutches and the said actuating means enabling the transmission ratio to be changed without interrupting the transmission of a rotational torque between the engine shaft and the driven shaft, the change from a first to a second transmission ratio comprising maintaining a first mechanism in use and putting in the rest position a second one-way lock-up mechanism of the free pinion for the first ratio, bringing a first one-way mechanism for the said second ratio into use, performing at least one controlled clutch operation, putting the second mechanism for the first transmission ratio into its rest position, and bringing the second mechanism for the second transmission ratio into use. In the apparatus according to the invention, the change of transmission ratio takes place without hunting in the clutches, and thereby avoids all the above-mentioned disadvantages of the prior art.

According to yet another feature of the invention, the control sequence for the one-way lock-up mechanisms is the same for all the changes of transmission ratio.

In other words, the first and second lock-up mechanisms of the free pinions for the various transmission ratios will always be actuated in the same way and in the same order regardless of the transmission ratio being changed, and this greatly facilitates automatic control of the apparatus according to the invention.

As a result, the means for actuating the one-way lock-up mechanisms for the various free pinions can be governed by a single actuator.

In one preferred embodiment of the invention, the driving pinions for the transmission ratios are mounted alternately on the two input shafts, for example the driving pinions for the first, third and fifth ratios on the first input shaft and the driving pinions for the second, fourth and sixth ratios on the second input shaft.

Depending on the circumstances, the free pinions may be the driving pinions, mounted on the output shaft of the apparatus, or they may be the driving pinions mounted on the input shaft or shafts of the apparatus, or they may even comprise some driving pinions mounted on the input shaft or shafts and some driven pinions mounted on the driven shaft, depending on the torque to be transmitted, overall size, and other considerations relating to the mounting of the one-way lock-up mechanisms and their actuation.

In a preferred embodiment, the actuating means for the one-way lock-up mechanisms comprise at least one cam, which is mounted inside the shaft that carries the said free pinions and which is connected to an actuator by means of an axial rod.

Where the apparatus according to the invention has two input shafts as indicated above, the actuating means comprise two cams, one for locking and unlocking the free pinions for the ratios in respect of which the driving pinions are on the first input shaft, and the other one for locking and unlocking the free pinions for the transmission ratios in respect of which the driving pinions are on the second input shaft.

Each cam acts on the one-way lock-up mechanisms by means of pushers, which are for example mounted in radial apertures in the tubular wall of the shaft that carries the above-mentioned free pinions.

The one-way lock-up mechanisms are arranged between the internal rows of teeth of the said free pinions and the above mentioned shaft, and they include pawls associated with return springs and with the pushers which are controlled by the cams and which are arranged to come into engagement, in a predetermined direction of rotation, on the rows of internal teeth of the free pinions or to be displaced away from the said teeth, respectively.

In accordance with further features of the invention:
- each cam is coupled in rotation with the shaft on or in which it is mounted,
- each cam is displaced in axial straight-line motion by means of a leadscrew and nut system, the leadscrew of which is coupled to an actuator, such as for example an electric motor, the nut of the system being fixed to the cam or consisting of the latter,
- in another version, each cam is fixed in rotation,
- the one-way lock-up mechanisms for a free pinion are located on either side of the said pinion,
- in another version, the one-way lock-up mechanisms for a free pinion are on the same side of the said pinion,
- the two clutches of the apparatus according to the invention are of the type that operates dry, and are disposed on the outside of a casing containing the said pinions,
- in a further version, a said clutch is a dry clutch on the outside of the casing containing the said pinions, while the other clutch is a multidisc clutch in oil, and is inside the said casing.

According to still a further feature of the invention, the apparatus includes a reverse gear pinion mounted on the input shaft that carries the driving pinion for the first transmission ratio, an intermediate pinion coupling the reverse gear pinion to a driven pinion mounted on the driven shaft, and controlled means for coupling together either the reverse gear pinion and the input shaft, or the driven pinion and the driven shaft.

In that case, the controlled coupling means may comprise synchronising means and meshing means of a conventional type.

In modified versions, the selective coupling means for the free pinions in forward gears are all one-way lock-up mechanisms of the above mentioned type, although some of them may be of this type with others being meshing means of a conventional type.

In general terms, the apparatus according to the invention combines the advantages of automatic transmissions with fluid couplings and epicyclic gear trains with those of manual gearboxes, while avoiding their respective disadvantages.

The apparatus is preferably associated with means for absorbing vibrations, arranged either on the engine shaft or on the input shafts of the apparatus.

BRIEF DESCRIPTION OF THE DRAWINGS

The invention will be understood more clearly, and further features, details and advantages of it will appear more clearly from a reading of the following description, which is given by way of example and with reference to the attached drawings, in which.

DETAILED DESCRIPTION OF PREFERRED EMBODIMENTS

Figure 1:
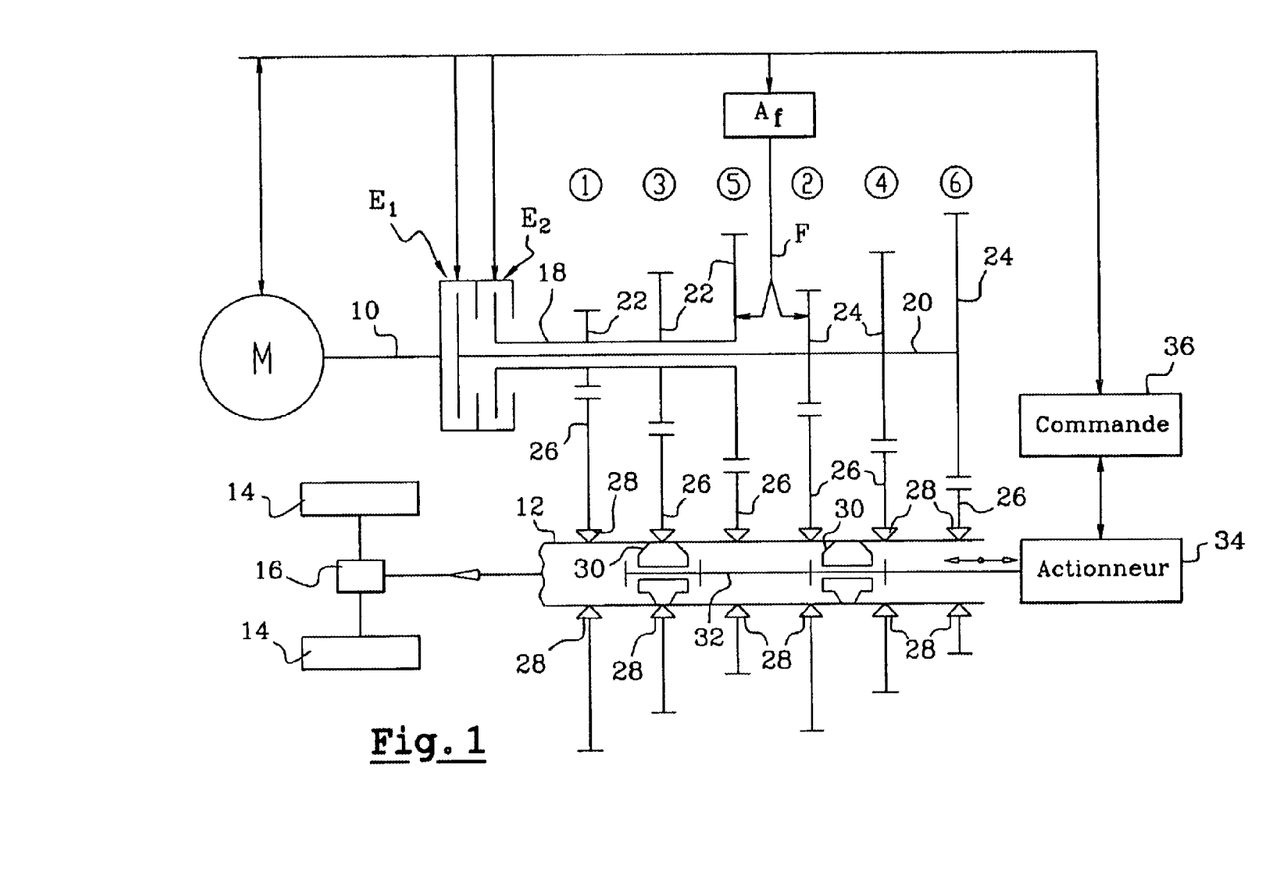
FIG. 1 is a diagrammatic representation of a transmission apparatus according to the invention.

FIG. 1 shows diagrammatically a first embodiment of an automatic gear-type transmission apparatus according to the invention, this apparatus being arranged to connect the output shaft 10 of a heat engine M, in particular an internal combustion engine for a motor vehicle, to a driven shaft 12 which is the output shaft of the transmission device, and which, in the case of application to a motor vehicle, is arranged to drive road wheels 4 in rotation through an interposed differential 16.

The apparatus according to the invention has two input shafts 18, 20 which, in this version by way of example, are coaxial, with the shaft 20 extending inside the shaft 18, these shafts being connected to the output shaft 10 of the engine through clutches E1, E2 respectively.

Each driving shaft 18, 20 carries driving pinions 22, 24 respectively, each of which is in constant engagement with a driven pinion mounted on the output shaft or driven shaft 12, the pairs of mating pinions 22, 26 and 24, 26 defining transmission ratios which are numbered from 1 to 6 in the embodiment in FIG. 1, and which are progressively increasing, the driving pinions for the various transmission ratios being mounted alternately on the first input shaft 18 and the second input shaft 20.

In the example in FIG. 1, the driving pinions for the first, third and fifth ratios are on the shaft 18, while the driving pinions for the second, fourth and sixth ratios are on the input shaft 20.

In this apparatus, for each transmission ratio defined by a pair of pinions 22, 26 or 24, 26, one of the pinions is rotatable with the shaft on which it is mounted, while the other one is freely rotatable on its shaft, means being provided for selectively coupling this free pinion and its shaft fixedly together for effecting the engagement of a transmission ratio.

Still in the embodiment shown in FIG. 1, it is the driven pinions 26 for the different transmission ratios that are free in rotation on the output shaft 12, the driving pinions 22 and 24 being coupled in rotation with the shafts 18 and 20 respectively.

In another version it is the driving pinions 22, 24 that can be mounted so as to be freely rotatable on the shafts 18, 20 and associated with means for selective anchoring on their shafts.

In a further version, the driving pinions for certain transmission ratios may be mounted for free rotation on the corresponding shaft 18, 20, the driven pinions for these ratios being fixed to the output shaft 12, and the driving pinions for other transmission ratios may be fixed on the corresponding shaft 18, 20 for rotation with it, the driven pinions for these ratios being freely rotatable on the output shaft 12 and associated with selective coupling means.

The remainder of the description will be limited to the case in which, as shown in FIG. 1, the driving pinions for all the transmission ratios are rotatable on the shafts 18, 20 and the driven pinions for all the transmission ratios are freely rotatable on the output shaft 12 and associated with selective coupling means for coupling them in rotation with the output shaft 12.

In accordance with the invention, the means for selectively coupling a driven pinion in rotation with the shaft 12 comprise two controlled one-way lock-up mechanisms, which are mounted in opposed relationship between the driven pinion and the shaft 12, and each of which is able to occupy two positions, namely a rest position and a working position respectively, one of these mechanisms, when in its working position, preventing the driven pinion from rotating at a velocity greater than that of the shaft 12, while the other mechanism, in its working position, prevents the driven pinion from rotating at a velocity less than that of the shaft 12.

Thus, when the two one-way lock-up mechanisms for the driven pinion are at rest, the pinion is freely rotatable on the shaft 12.

If one of these mechanisms is at rest and the other in its working position, the velocity of rotation of the driven pinion can be greater than that of the shaft 12, but cannot be less than the latter.

When the positions of the two lock-up mechanisms are reversed, the velocity of rotation of the driven pinion can be less than that of the shaft 12 but cannot exceed it.

When the two one-way lock-up mechanisms are both in their working position, the driven pinion is coupled to the shaft 12 for rotation with it.

The actuating means for the one-way lock-up mechanisms 28 are contained within the shaft 12, and in this example they consist of two cams 30, which are mounted on a common rod 32 which extends axially inside the shaft 12 and which is connected at one end to an actuator 34 governed by control means 36 of the transmission, which also govern the clutches E1, E2 and are connected to the control system of the engine for exchanging information or actions. One of the cams 30 controls the one-way lock-up mechanisms 28 of the driven pinions 26 for transmission ratios 1, 3 and 5, while the other cam 30 controls the one-way lock-up mechanisms of the driven pinions 26 for transmission ratios, 2, 4 and 6.

In every case the cams 30 can be fixed in rotation or can rotate with the output shaft 12, as will be seen in more detail below.

Figure 2:
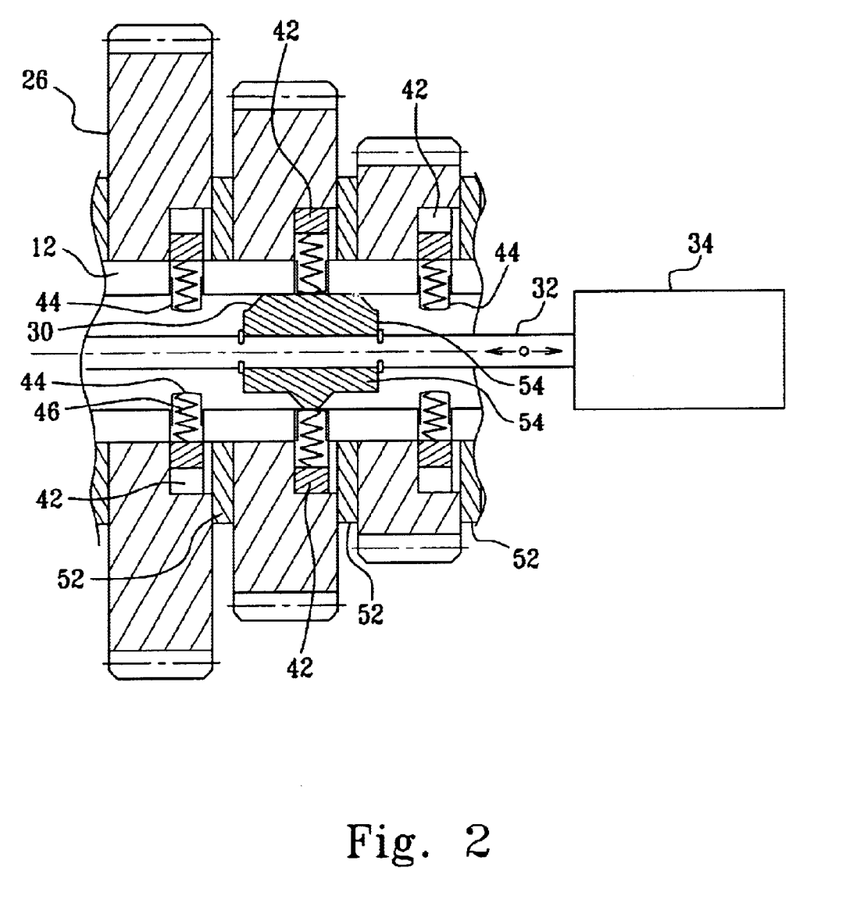
FIG. 2 is a diagrammatic view on an enlarged scale and in axial cross section, of the one-way lock-up means for locking a pinion on a shaft.
Figure 3:
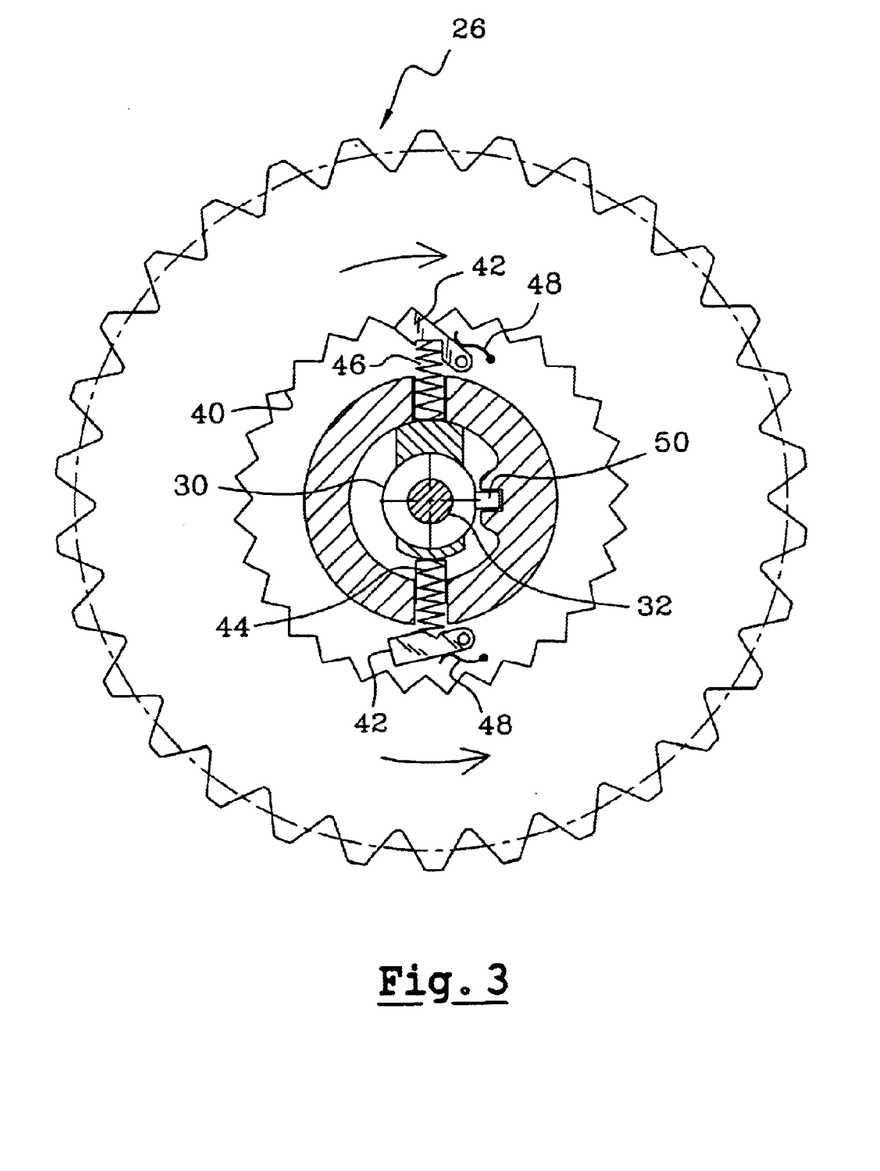
FIG. 3 is a diagrammatic partial front view of a one-way lock-up mechanism.

One embodiment of the one-way mechanisms 28 associated with the driven pinions 26 is shown diagrammatically in FIGS. 2 and 3.

In this version, a row of internal teeth 40 is formed in one major face of each free pinion 26, for co-operating with at least two pawls 42 which are fixed to the shaft 12 for rotation with it, each pawl being displaceable by means of a pusher 44 with a resilient member 46, between a rest position in which it is spaced away from the corresponding row of teeth of the pinion 26, and a working position in which it is in engagement with that row of teeth, so as to prevent rotation of the pinion 26 around the shaft 12 in the direction indicated by an arrow in FIG. 3, and so as to permit the pinion 26 to rotate in the opposite direction around the shaft 12.

The pushers 44 are guided in radial holes in the shaft 12, and are displaced radially towards the outside of the shaft 12 during the axial forward movement of the cam 30 within the shaft 12. Return means, shown diagrammatically at 48 in FIG. 2, serve to return the pushers 44 and pawls 42 into the rest position, when the axial position of the cam 30 in the shaft 12 permits.

In this embodiment, each cam 30 is fixed to a shaft 12 for rotation with it, for example by means of a longitudinal rib 50 which is received in an internal longitudinal groove in the shaft 12.

The cam 30 is a substantially cylindrical tubular member with frustoconical ends which constitute ramps for displacement of the pushers 44 towards the outside of the shaft 12, so as to bring the pawls 42 into engagement with the teeth 40.

The two lock-up mechanisms 28 of a pinion 26 are diametrically opposed to each other in relation to the axis of rotation. The pushers 44 acting on the pawls 42 of these mechanisms are also diametrically opposed to each other, and are displaceable radially by means of two longitudinal cam tracks 54 of different profiles, which are formed in diametrically opposed relationship to each other on the outer surface of the cam 30. The axial displacement of the cam 30 by the actuator 34 and rod 32, inside the shaft 12, puts one of the cam tracks 54, or both of them, into contact with a pusher 44 or with both pushers 44, so as to put one of the one-way mechanisms 28, or both of them, in its working position.

It will be noted in FIG. 2 that the displacement of the cam 30 in one direction or the other always controls the mechanisms 28 for the pinions 26 in the same way and in the same order, and that the cam tracks 54 are symmetrical with respect to a central transverse plane of the cam.

In another version, these cam tracks may be asymmetrical with respect to a central plane, so that they enable a common sequence of operations to be achieved for a change of ratio N→N+1, and for the change from N to N−1.

Advantageously, and as shown diagrammatically in FIG. 2, the pawls 42 are articulated about axes parallel to the axis of the shaft 12, on spacing rings 52 which extend along the flanks of the pinions 26 that include the rows of teeth 40, and which are fixed in rotation to the shaft 12. This facilitates fitting of the one-way lock-up mechanisms.

Reference is now made to FIGS. 4 to 8, for a description of the operation of the apparatus according to the invention.

In what follows, it will be supposed in general terms that the velocity of rotation of the shaft 12 is constant, so that the way in which the transmission ratio changes are controlled and achieved will be described with that being the case.

Figure 4:
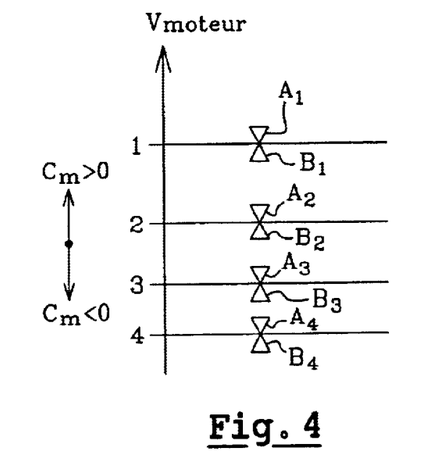
FIG. 4 is a graph illustrating the methods of operation of the one-way lock-up mechanism for several transmission ratios.
Figure 5:
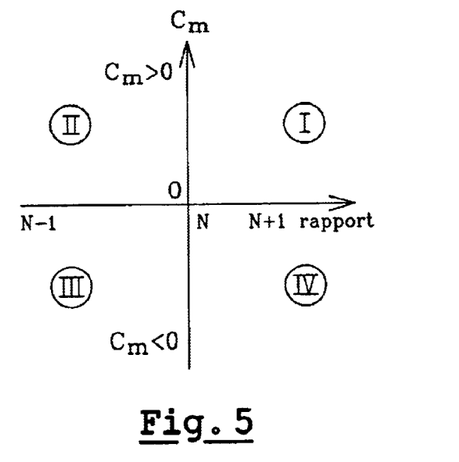
FIG. 5 is a graph showing the four possible cases of transmission ratio changes as a function of the rotational torque applied to the driven shaft and the ascent and descent of the ratios.

The following conventions, illustrated in FIGS. 4 and 5, will be used to facilitate the description.

FIG. 4 is a graph showing the steps in the rotational velocities of the engine shaft corresponding to four first transmission ratios for a given constant velocity of the output shaft 12. The references A1, B1, A2, B2, A3, B3 and A4, B4 represent, respectively, the one-way lock-up mechanisms 28 associated with the driven pinions 26 for the four first transmission ratios and their actions on the said free pinions, as a function of the rotational torque transmitted to the output shaft 12, which may be a positive engine torque (designated by $C_{m>0}$) exerting a tractive force on a vehicle, or a negative engine torque (designated by $C_{m<0}$), exerting a braking force on the vehicle, and also as a function of the direction in which the rotational velocity of the engine shaft 10 varies, this rotational velocity being indicated by increasing values on the vertical axis in FIG. 4.

In that Figure, the references A apply to the one-way lock-up mechanisms that prevent the driven pinions 26 from rotating faster than the output shaft 12, and the references B are applied to the one-way mechanisms which prevent them from rotating more slowly than the shaft 12.

FIG. 5 shows diagrammatically the four possible cases of transmission ratio change as a function of engine torque and ascent or descent in the transmission ratios.

Cases I and II are those in which the rotational torque applied to the output shaft 12 is the engine torque ($C_{m>0}$), case I corresponding to ascent (change from ratio N to ratio N+1), while case II is that for descent (i.e. change from ratio N to N−1).

Cases III and IV are those in which the rotational torque applied to the shaft 12 is a braking torque ($C_{m<0}$), case III being that for descent from ratio N to ratio N−1, and case IV being that of ascent from ratio N to ratio N+1.

Figure 6A:
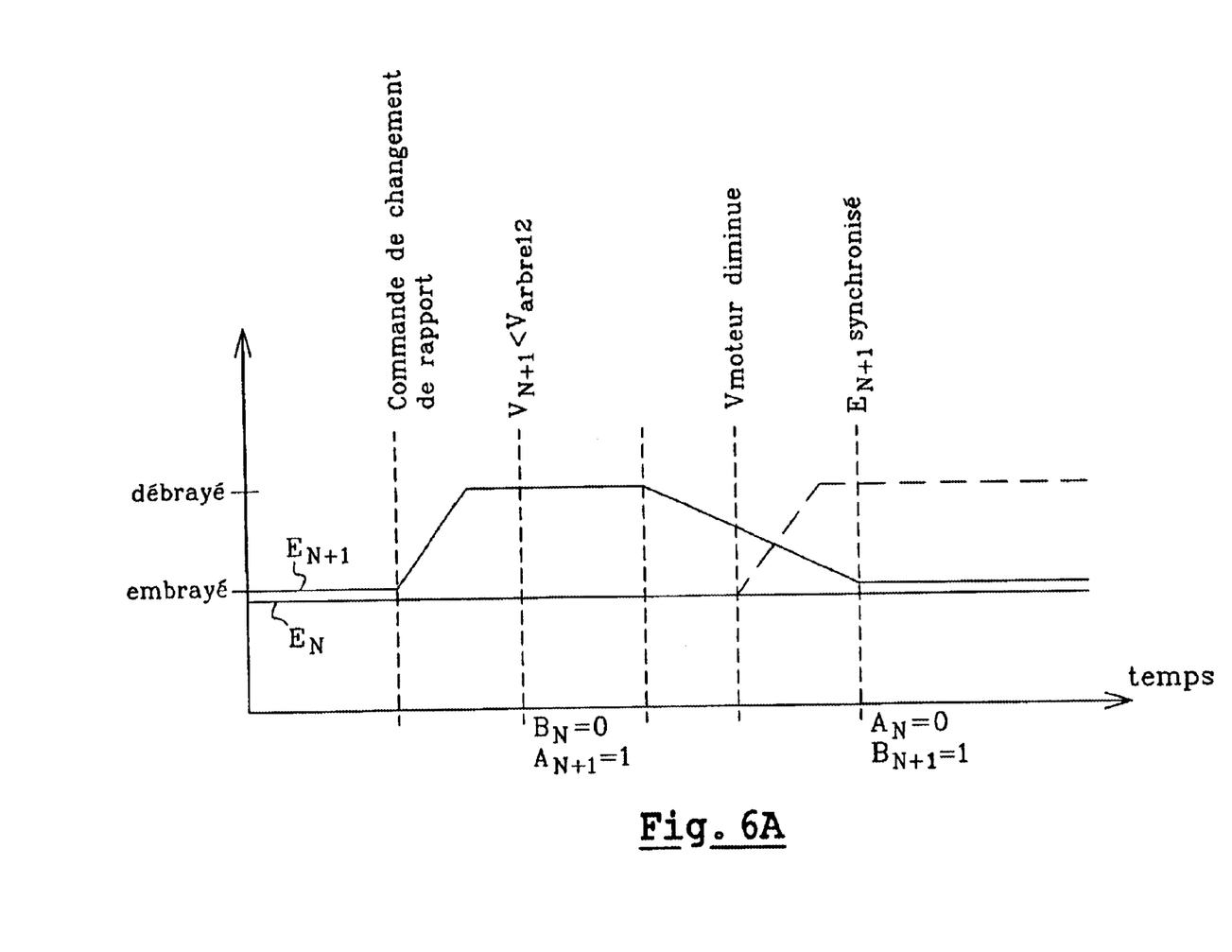
FIGS. 6A and 6B are graphs illustrating the clutch control operations during transmission ratio changes.
Figure 7:
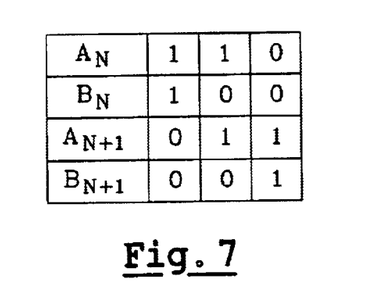
FIGS. 7 and 8 are two tables showing the states of one-way lock-up mechanisms in two possible cases of transmission ratio changes.

The graph in FIG. 6A illustrates the controls for the clutches E1 and E2 in case I ($C_{m>0}$ and change from ratio N to ratio N+1), the states of the corresponding one-way lock-up mechanisms being shown in the table in FIG. 7.

Initially, the transmission ratio N is engaged, the one-way mechanisms associated with the driven pinion 26 for that transmission ratio are in their working position ($A_N=B_N=1$), and the clutch which couples the input shaft carrying the driving pinion for this transmission ratio is engaged ($E_N$ in the engaged state in the graph in FIG. 4), the rest state of a clutch being the state in which it is engaged, its activated state being the disengaged state. The driven pinion 26 for the transmission ratio N+1 is driven by its driving pinion carried by the other input shaft. The associated clutch $E_{N+1}$ is declutched if it was engaged up to that point. The velocity of rotation of the corresponding input shaft, which was equal to the velocity of rotation of the shaft 10 if the clutch associated with the ratio N+1 was closed, can start to diminish. This reduction is applied by braking the said input shaft until the velocity of rotation of the driven pinion 26 for the ratio N+1 becomes less than the value of synchronisation with the velocity of rotation of the output shaft 12 beyond which it is possible to actuate the one-way lock-up mechanism $A_{N+1}$ that prevents the pinion 26 from rotating at a velocity greater than that of the shaft 12.

Since the rotational torque transmitted to the shaft 12 is an engine torque, the set of teeth 40 in the driven pinion 26 for the transmission ratio N is in abutment on the pawl 42 of the one-way lock-up mechanism $A_N$ which prevents the pinion 26 from rotating faster than the output shaft 12, and which therefore permits an engine torque to be transmitted to the output shaft 12. Since the row of teeth 40 in the pinion 26 is in engagement on the pawl 42 of the mechanism $A_N$, it is not in engagement or abutment on the pawl 42 of the other lock-up mechanism $B_N$, which can therefore be put into its rest position ($B_N=0$) at the same time as the mechanism $A_{N+1}$ is brought into use. Values $A_N=1$, $B_N=0$, $A_{N+1}=1$ and $B_{N+1}=0$ are therefore obtained as shown in the second column of the table in FIG. 7.

The next step consists in progressively engaging the clutch associated with the ratio N+1, as shown diagrammatically in FIG. 6A. Because of this progressive engagement, the engine torque transmitted to the shaft 12 through the pinion 26 for the ratio N+1 increases progressively from zero. At first, the velocity of the driven pinion for the ration N+1 increases, and this pinion comes into engagement on the pawl of the mechanism $A_{N+1}$. The velocity of the engine then decreases progressively down to the value corresponding to the ratio N+1.

It is possible at this time to act on the lock-up mechanism $B_{N+1}$ to put it in its working position. Simultaneously, because the rotational velocity of the engine shaft 10 has been reduced, the velocity of rotation of the pinion 26 for the ratio N is smaller than the value corresponding to synchronisation with the velocity of rotation of the output shaft 12, and the one-way lock-up mechanism $A_N$ can be put in its rest position. The states now reached which is represented in the third column of the table in FIG. 7, in which $A_N=B_N=0$, $A_{N+1}=B_{N+1}=1$, which corresponds to engagement of the transmission ratio N+1, the ratio N being disengaged.

The clutch $E_N$ associated with the transmission ratio N can stay in the engaged state, especially when this corresponds to a rest position of its actuator, or it can be disengaged as is represented in broken lines.

Figure 6B:
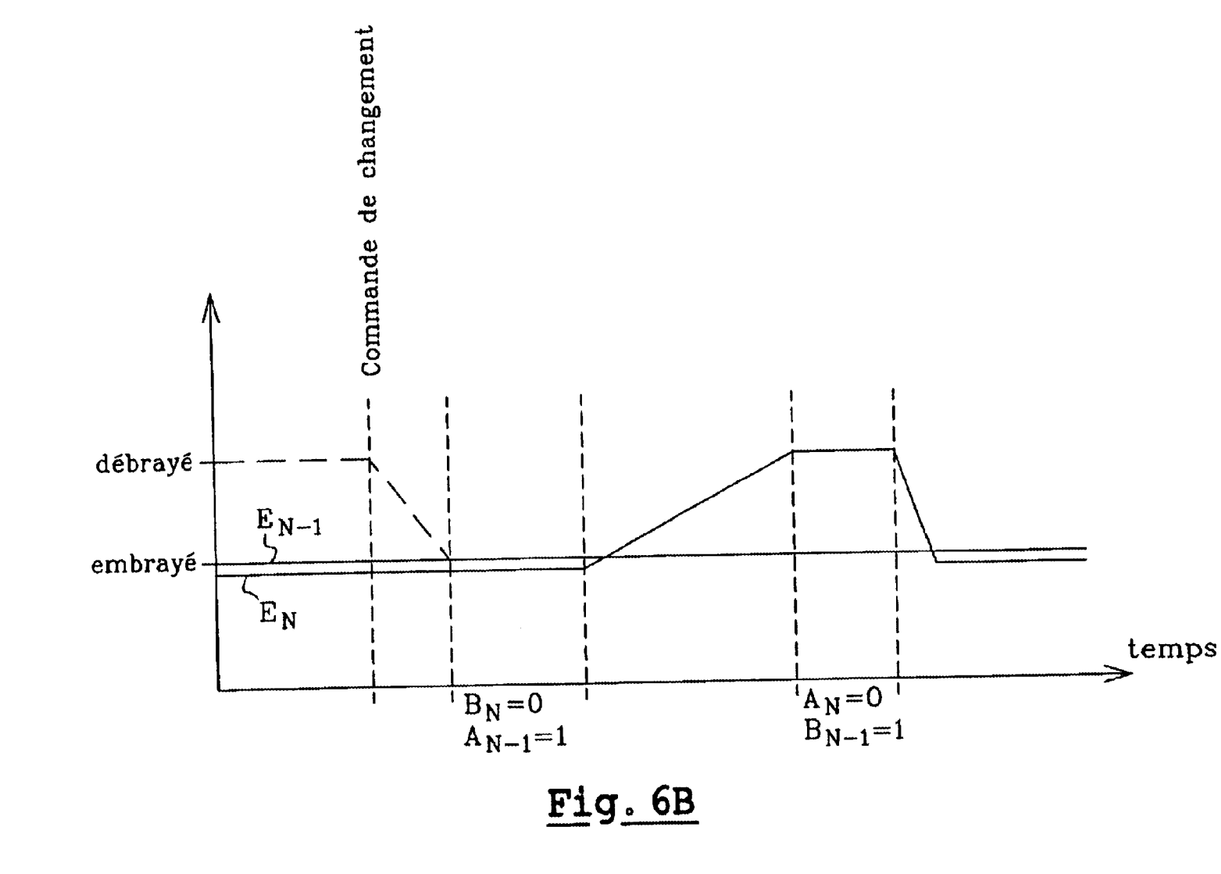
Figure 8:
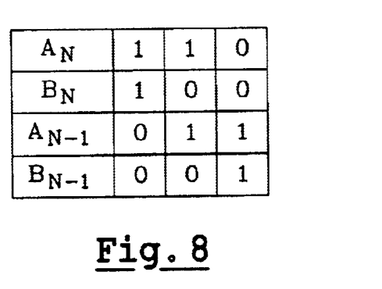

The brake which is used to reduce the velocity of rotation of that one of the input shafts 18 and 20 for which the clutch E1 or E2 has just been disengaged or declutched, may be a disc or drum type brake of a conventional type, arranged to act on the flank of the pinion 22 or 24. Braking means F may with advantage be disposed between the driving pinion 22 for the fifth ratio and the driving pinion 24 for the second ratio, with the braking means for the shaft 18 and that for the shaft 20 being controlled from a single actuator $A_F$, the braking actions exerted simultaneously on the two shafts 18 and 20 being effective only on the shaft for which the clutch has just been disengaged (the braking action on the clutch connected through its clutch E1 or E2 to the engine shaft 10 being very much smaller than the engine torque and not having any significant effect on the velocity of rotation of that shaft 18 or 20).

Where the change in transmission ratio takes place under conditions corresponding to case II (in which the engine torque is applied to the output shaft 12 and the ratio is changed from N to N−1), the following method is used, shown in FIG. 6B and summarised in the table in FIG. 8, in order to have a succession of operations for controlling the one-way lock-up mechanisms which is identical to that which has just been described for case I, but performed in reverse order.

It starts with the state shown in the first column of the table in FIG. 8, with $A_N=B_N=1$ (the transmission ratio N being engaged), and $A_{N-1}=B_{N-1}=0$.

If the clutch associated with the input shaft 18 or 20 for the ratio N−1 is in the engaged state, this input shaft is driven by the engine shaft 10 and the velocity of rotation of the driven pinion 26 for the ratio N−1 is lower than the speed of synchronisation with the output shaft 12.

Since an engine torque is transmitted to the output shaft 12 by the pinion 26 for the transmission ratio N, the row of teeth 40 of that pinion is in engagement on the pawl 42 of the mechanism $A_N$, so that the mechanism $B_N$ can be put in its rest position ($B_N$=0). Simultaneously, the lock-up mechanism $A_{N-1}$ which enables its driven pinion 26 to rotate at a velocity smaller than that of the driven shaft, can be put in its working position ($A_{N-1}$=1). The situation then prevailing is that corresponding to the second column in the table in FIG. 8.

The clutch associated with the input shaft 18 or 20 for the transmission ratio N is then progressively opened or disengaged, the effect of which is to reduce the engine torque transmitted through the pinion 26 at the ratio N, and to increase the velocity of rotation of the engine shaft 10 until the value corresponding to the velocity of synchronisation of the pinion 26 for the ratio N−1 with the output shaft 12 is reached. This synchronisation velocity having been achieved, and the row of teeth 40 of the pinion 26 for the ratio N−1 being in abutment on the pawls 42 of the mechanism $A_{N-1}$ for transmission of an engine torque to the output shaft 12, it becomes possible to put the mechanism $B_{N-1}$ into its working position corresponding to engagement of the ratio N−1.

The clutch associated with the input shaft for the ratio N being disengaged or declutched, the corresponding pinion 26 is no longer transmitting any torque, which enables the lock-up mechanism $A_N$ to be put in its rest position. This reduction in the velocity of rotation is preferably obtained in a positive manner by engagement of the braking means described earlier herein. The state then prevailing is that which is shown in the third column of the table in FIG. 8, in which $A_N$=$B_N$=0, and $A_{N-1}$=$B_{N-1}$=1.

As regards cases III and IV of changes in the transmission ratio, when the torque applied to the output shaft 12 is a braking torque, reversion to cases II and I respectively is preferably obtained, by means of a temporary command from the control system of the engine M, modifying the braking torque transmitted to the shaft 12 and an engine torque, preferably with a quite low value.

The same is true if the engine is delivering a torque with a value which is too close to zero.

This modification, which is of very short duration (for example less than 1 second) is not perceptible by the driver of the vehicle, and enables a single control law to be used in all cases of change of transmission ratio.

As a consequence, the same actuator governed by the same control circuit can perform all the possible cases of transmission ratio change.

Figure 9A:
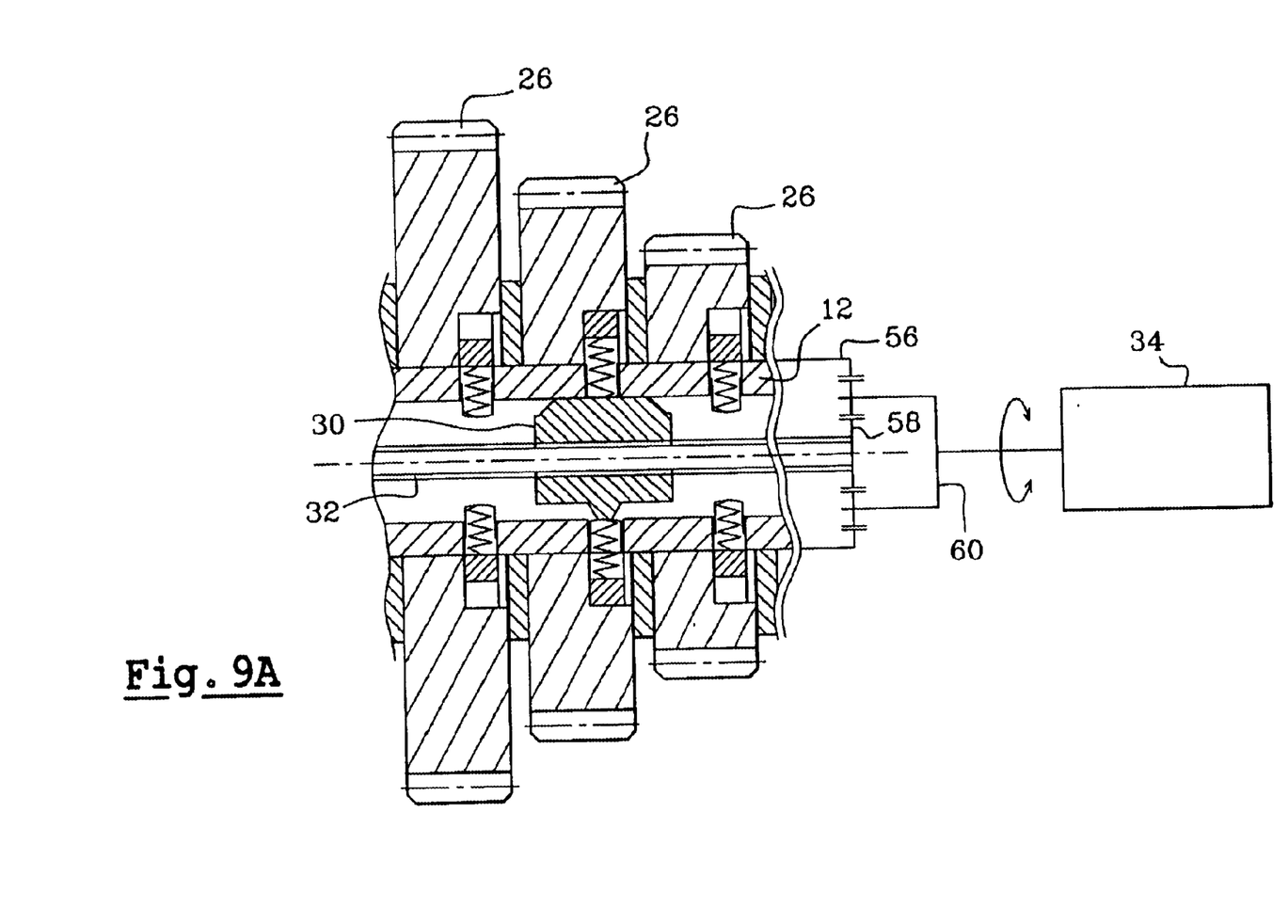
FIGS. 9A, 9B and 10 show diagrammatically modified versions of the actuating means of the one-way lock-up mechanisms.

In the embodiment in FIG. 9A, the cams 30 which are displaced by the actuator 34 rotate with the output shaft 12, and the displacement of each cam 30 in the shaft 12 can be obtained through differential rotation of the cam 30 on the rod 32, which is threaded. For this purpose, the threaded rod 32 is connected to the actuator 34 through an epicyclic gear train, the crown 56 of which is coupled in rotation to the output shaft 12, with its sun wheel 58 being fixed to the threaded rod 32 while the planet wheel carrier of this gear train is driven in rotation by the actuator 34, which in this case is a small electric motor. The epicyclic gear train does not transmit any high force, and can be made of plastics material.

The increase and decrease of the velocity of rotation of the actuator 34 with respect to the velocity of rotation of the shaft 12 enables the cam 30 to be displaced in a straight line in either direction within the shaft 12.

Figure 9B:
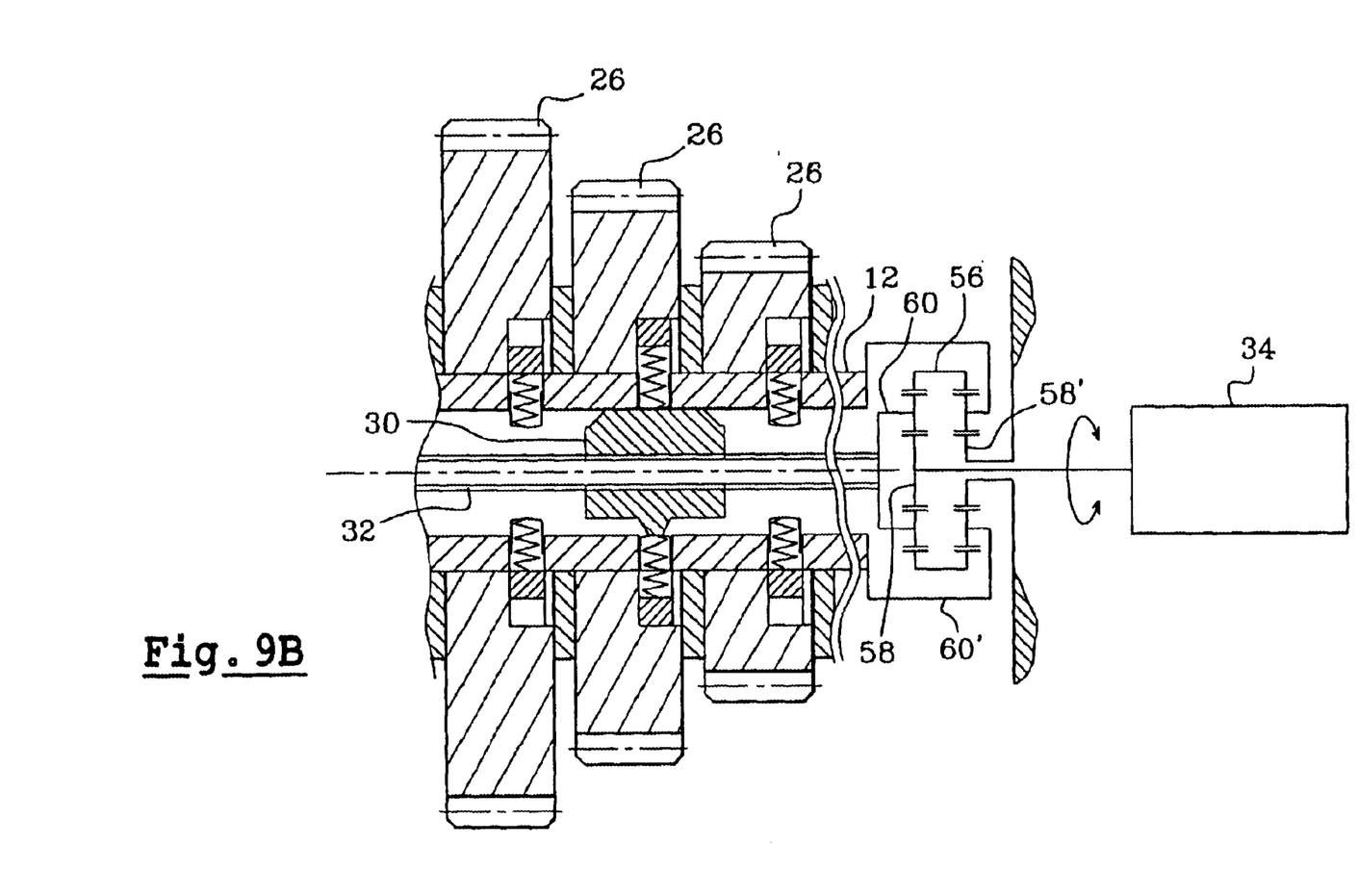

In the version in FIG. 9B, the actuator 34 is coupled to the threaded rod 32 and to the shaft 12 through a double epicyclic gear train, the crowns 56 are coupled for rotation together. The sun wheel 58 of the first epicyclic gear train is fixed to the output shaft of the actuator 34, and the sun wheel 58' of the second gear train is fixed in rotation. The planet wheel carrier 60 of the first gear train is fixed to the threaded rod 32, and the planet wheel carrier 60' of the second gear train is fixed to the shaft 12. The first gear train constitutes a differential, and the second one a reducing gearbox. The gear ratios are the same in both gear trains, so that the output shaft of the actuator 34 rotates only in order to displace the cams 30 in one direction or the other for the purposes of changing the transmission ratios, and it is at rest between these changes.

Figure 10:
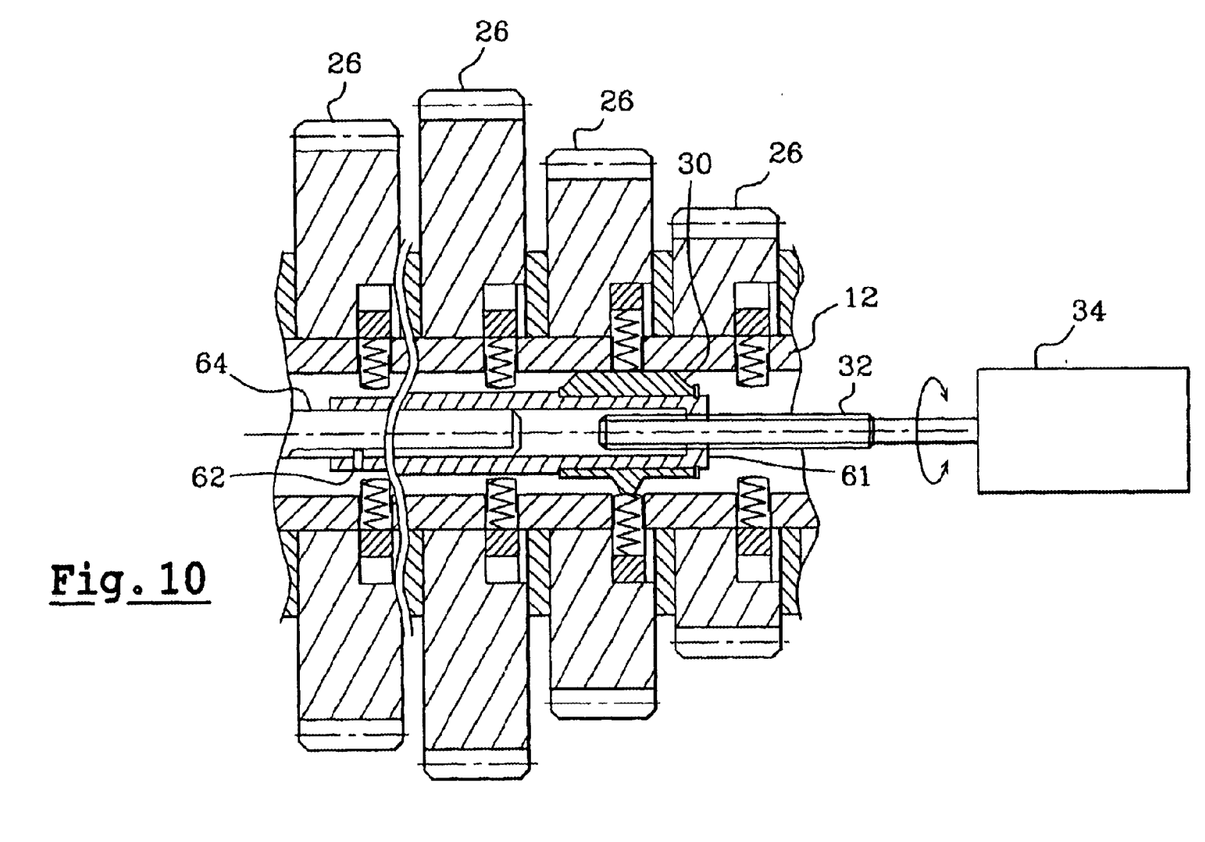

In the version shown in FIG. 10, each cam 30 rotates with the shaft 12, and is displaced axially by a leadscrew and nut system consisting of the threaded rod 32 driven in rotation by the actuator 34, and a nut 61 which is threaded on the threaded rod 32 and on which the cam 30 is mounted for rotation. The nut 61 is immobilised against rotation by means 62 for guiding it in axial sliding movement and for preventing it from rotating on a fixed member 64, which is for example mounted on a casing or the like.

In another version, when the actuating means for the one-way lock-up mechanisms cannot be mounted inside the output shaft 12, they are mounted around the outer peripheral surface of the shaft 12, and are controlled by means situated for example between two pinions 26.

Figure 11:
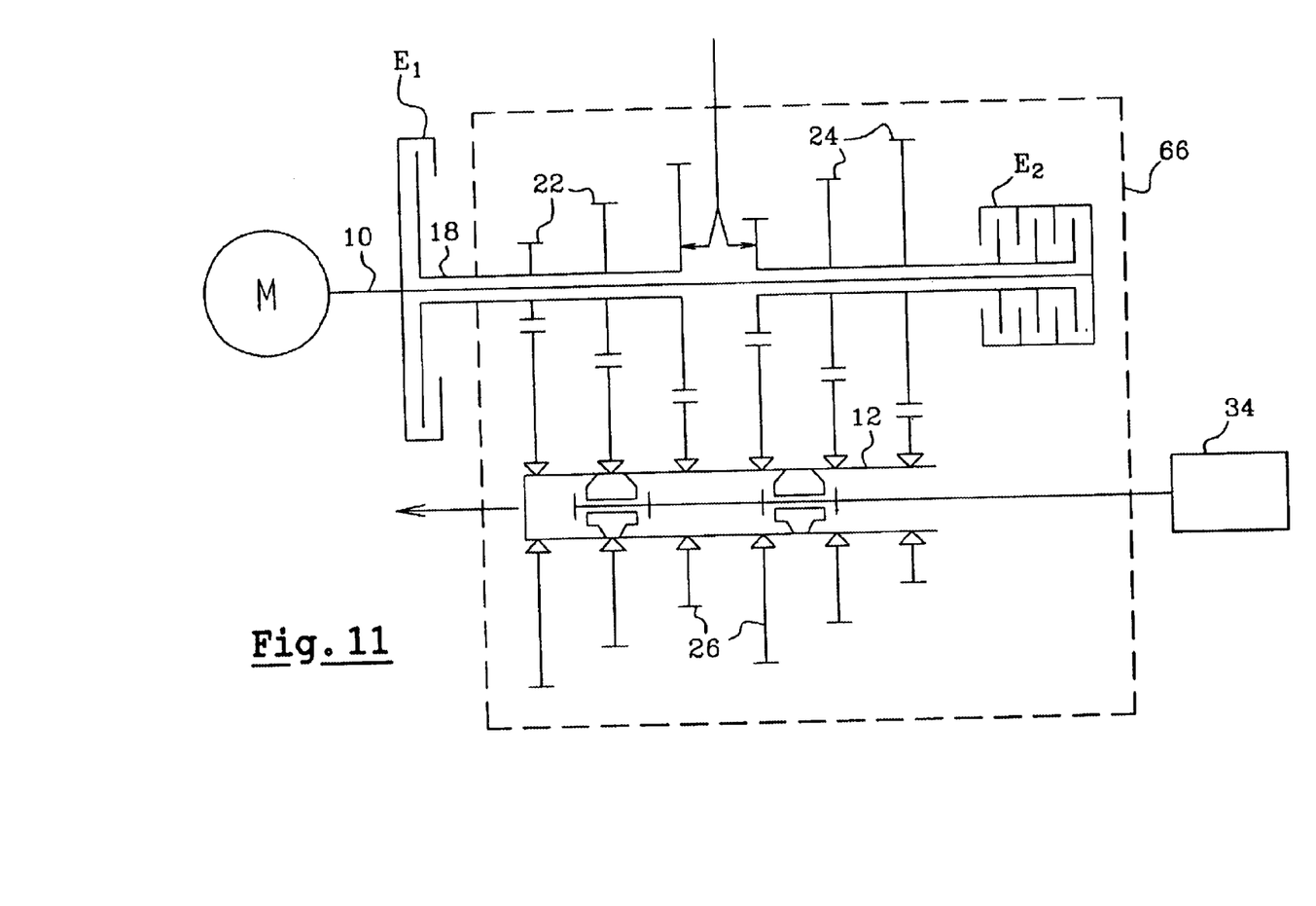
FIGS. 11 and 12 are diagrammatic partial representations of two modified embodiments of an apparatus according to the invention.

In the modified embodiment shown in FIG. 11, the clutch E1 which connects the engine shaft 10 with the input shaft 18 carrying the driving pinions 22 for the first, third and fifth transmission ratios is a dry monodisc clutch which is on the outside of a casing 66 containing the above mentioned pinions 22, 24, 26, while the clutch E2 which couples to the engine shaft 10 the input shaft 20 that carries the driving pinions for the transmission ratios 2, 4 and 6 is a multidisc clutch in oil, and is arranged within the casing 66, which enables the outside diameter of this clutch to be reduced and facilitates fitting within the casing 66 of a shaft parallel to the shafts 12, 18 and 20 mentioned above and carrying an intermediate pinion which is part of the reverse gear train.

Preferably, the driving pinion for the reverse gear ratio is mounted on the shaft 18 that carries the driving pinion for the first transmission ratio. The clutch E1 associated with the shaft 18 is in this connected designed and dimensioned in such a way as to ensure starting of the vehicle with the first transmission ratio. This clutch is then able also to ensure starting of the vehicle in reverse gear. In that case, the other clutch E2 is a changeover clutch, and can be designed and dimensioned in a corresponding manner.

The above mentioned reverse gear intermediate pinion, mounted on the supplementary shaft, enables the direction of the rotational torque transmitted between a driving pinion mounted on the shaft 18 and a driven pinion mounted on the output shaft 12 to be reversed. This reverse gear driven pinion can be coupled selectively with the output shaft 12 by synchromesh means of a conventional type. The driven pinion can also be one of the transmission ratios in which the driving pinions are on the other input shaft 20. In that case, it is used with its one-way lock-up mechanisms.

Figure 12:
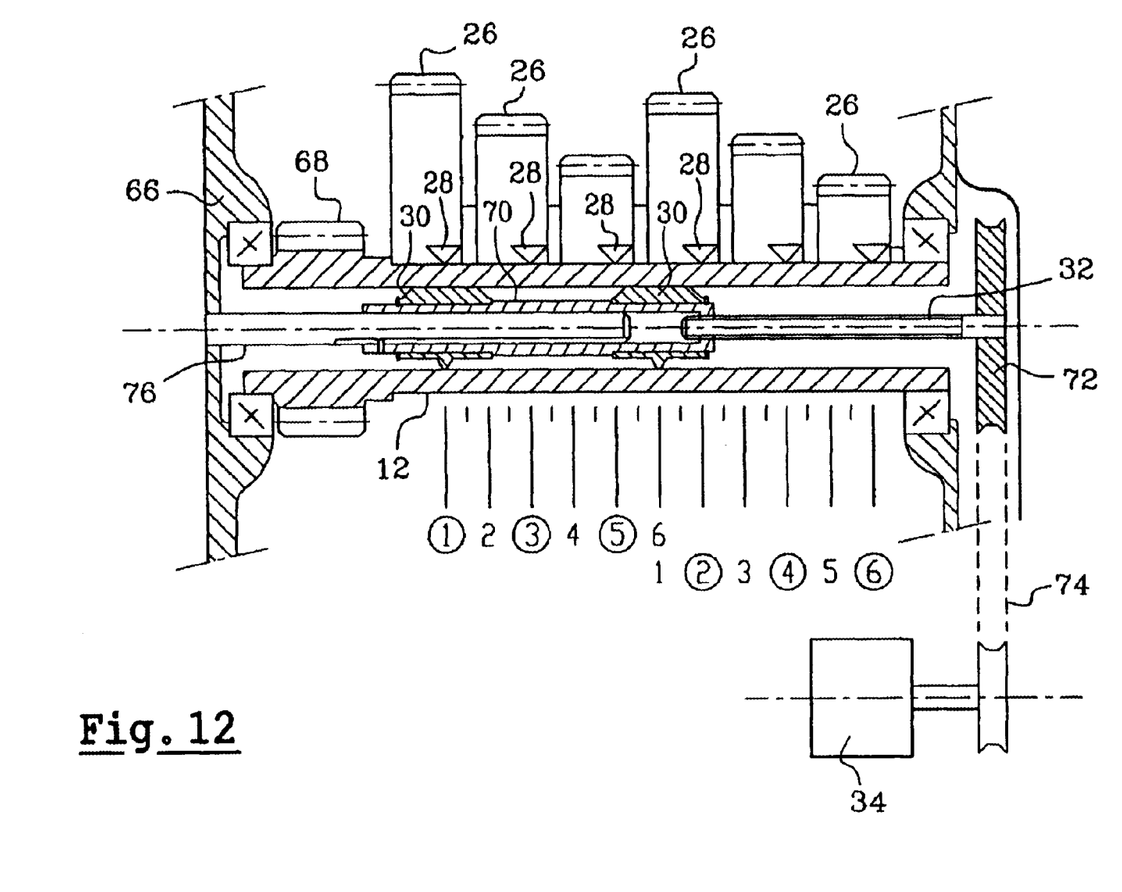

The modified embodiment shown in FIG. 12 has the advantage that its axial size is reduced, with the cams being driven by a leadscrew and nut system of reduced length, enabling the cams to be well guided axially and to be immobilised against rotation.

In this version, the output shaft 12 is supported at its ends by bearings which are mounted in the casing 66, and it comprises an output pinion 66 at one of its ends.

The two cams 30 are mounted for rotation on a tubular support 70, one end of which constitutes a nut threaded on the end of a threaded axial rod 32, the other end of which carries a pulley 72, or a pinion or the like, which is connected through a synchronous transmission 74 to the actuator 34, which is mounted remotely.

The other end of the tubular element 70 is guided on an axial rod 76 which is fixed to, and not rotatable in, a wall of the casing 66, and which includes a longitudinal groove in which there is engaged a nib carried by the tubular element 70 so as to prevent rotation of that element.

The axial rods 32 and 76 are aligned in practice end to end, inside the output shaft 12.

This mounting enables each cam 30 to be displaced between its positions corresponding to transmission ratios 1, 3 and 5, for one of the cams, and to transmission ratios 2, 4 and 6 for the other cam, these positions being indicated by numbers surrounded by a circle. The numbers without circles indicate the positions taken by a cam when it is the other cam that acts on the one-way lock-up systems for a free pinion 26. For example, the number 2 situated between the encircled numbers 1 and 3 indicates the position of the left hand cam when the right hand cam is in a position in which the two one-way lock-up mechanisms for the free pinion 26 of the second transmission ratio are in their working position, for engagement of this transmission ratio.

The small intermediate lines between the numbered positions correspond to intermediate positions occupied by the cams during a change of transmission ratio.

In a more simple modified version of the invention, the apparatus has only one clutch, connecting the engine shaft to the input shaft and serving only for starting purposes, and the command for changing transmission ratio then comprises, besides the commands for the one-way lock-up mechanisms, a command to the engine for the temporary suspension (by less than a second) of the engine torque transmitted on the driven shaft. This suspension enables a negative engine torque to be transmitted, and enables the velocity of rotation of the engine to be then controlled so as to cause the new support to be engaged on a lock-up mechanism.

What is claimed is:

1. An automatic transmission apparatus, for a motor vehicle, adapted to couple an engine shaft (10) and an output shaft (12) together, and comprising two input shafts (18, 20), two clutches (E1, E2) arranged between the engine shaft (10) and the output shaft (12), driving pinions (22, 24) mounted on said input shafts and driven pinions (26) mounted on the output shaft (12), each driven pinion (26) being in constant engagement with a driving pinion (22, 24) and defining a transmission ratio, one of the pinions (22, 24, 26) for each ratio being fixed to the input shafts (18, 20) on which said one of the pinions is mounted while the other pinion (26) for said ratio is freely rotatable free pinion (26) on said output shaft (12), and means for selectively coupling each said free pinion (26) fixedly with said output shaft (12) for engagement of the corresponding transmission ratio, wherein each of said two input shafts (18, 20) and said two clutches (E1, E2), couples one input shaft to the engine shaft (10), with each input shaft carrying at least one driving pinion (22, 24), and wherein the selective coupling means comprise, for at least one free pinion (26), first and second controlled one-way lock-up mechanisms (28), mounted in opposition to each other between the free pinion (26) and said output shaft (12), and each said first and second lock-up mechanisms able to occupy two positions, namely a rest position and a working position in which said first mechanism prevents the free pinion (26) from rotating faster than said output shaft while the second mechanism prevents the free pinion (26) from rotating slower than said output shaft, and actuating means (30, 32) for actuating the lock-up mechanisms (28), said actuating means comprising at least one cam which is displaceable in one of straight line motion and in rotation.

2. Apparatus according to claim 1, further comprising means (36) for controlling said clutches and said actuating means (30, 32, 34) enabling the transmission ratio to be changed without interrupting the transmission of a rotational torque between the engine shaft (10) and the output shaft (12), the change from a first to a second transmission ratio comprising maintaining the first lock-up mechanism in use and putting in the rest position the second one-way lock-up mechanism of the free pinion for said first ratio, bringing the first one-way lock-up mechanism for said second ratio into use, putting the second one-way lock-up mechanism for said first ratio into its rest position, and bringing the second one-way lock-up mechanism for said second ratio into use.

3. Apparatus according to claim 2, wherein the change from one transmission ratio to another includes at least one controlled clutch operation.

4. Apparatus according to claim 1, wherein the driving pinions (22, 24) for the transmission ratios are mounted alternately on the two input shafts.

5. Apparatus according to claim 1, wherein a control sequence for the one-way lock-up mechanisms (28) is the same for all the changes of transmission ratio.

6. Apparatus according to claim 5, wherein the control sequence for the one-way lock-up mechanisms for a change to a lower ratio is in the opposite sense from the sequence for a change to a higher ratio.

7. Apparatus according to claim 1, wherein the actuating means (30, 32) for actuating the one-way lock-up mechanisms (28) for the free pinions are governed by a single actuator (36).

8. Apparatus according to claim 2, wherein said first lock-up mechanism (28) is the one that prevents a velocity of rotation of the free pinion (26) higher than the velocity of rotation of the output shaft (12) on which it is mounted.

9. Apparatus according to claim 1, wherein the change to a higher ratio comprises braking of the input shaft associated with said higher ratio.

10. Apparatus according to claim 9, wherein the change to a higher ratio includes progressive engagement of the clutch associated with said higher ratio.

11. Apparatus according to claim 1, wherein the change to a lower ratio includes progressive disengagement of the clutch associated with the higher ratio.

12. Apparatus according to claim 1, wherein, when the engine torque is negative at the instant of a change of ratio, the control operation includes control of the engine to increase its velocity of rotation and to pass into a positive engine torque during at least part of the ratio changing process.

13. Apparatus according to claim 1, wherein the control of the change from one transmission ratio to the other comprises control of the engine to give temporary cancellation of the engine torque applied to the output shaft.

14. Apparatus according to claim 1, wherein the actuating means for the one-way lock-up mechanisms (28) comprise said at least one cam (30), which is mounted on or inside the output shaft (12) that carries said free pinions (26) and which is connected to an actuator (34) by means of an axial rod (32).

15. Apparatus according to claim 14, wherein the actuating means comprise two cams (30) defining said at least one cam, one for control of the one-way lock-up mechanisms of the free pinions (26) for the ratios in respect of which the driving pinions are on the first input shaft (18), and the other one for controlling the one-way lock-up mechanisms of the free pinions (26) for the ratios in respect of which the driving pinions are on the second input shaft (20).

16. Apparatus according to claim 11, wherein said at least one cam (30) acts on the one-way lock-up mechanisms (28) by means of pushers (44) which are mounted radially on said output shaft (12).

17. Apparatus according to claim 1, wherein the one-way lock-up mechanisms (28) are arranged on the sides of the free pinions (26), and include locking members (42), associated with return springs (48) and pushers (44), which are arranged to engage on rows of teeth (40) on the flanks of the free pinions or to be displaced away from the said teeth (40), respectively.

18. Apparatus according to claim 17, wherein the lock-up mechanisms (28) are carried by rings (52) which are fixed in rotation to the output shaft (12) of the free pinions and which are interposed between the free pinions.

19. Apparatus according to claim 14, wherein said at least one cam (30) is coupled in rotation with the output shaft (12) on or in which it is mounted.

20. Apparatus according to claim 14, wherein said at least one cam (30) is fixed in rotation.

21. Apparatus according to claim 11, wherein said at least one cam (30) is displaced in axial straight line movement by means of a leadscrew and nut system, the leadscrew of which is a threaded axial rod (32) coupled to an actuator (34), the cam (30) being carried by the nut (61) and being rotatable on the latter, the nut being held against rotation.

22. Apparatus according to claim 21, wherein the nut (61) is guided in straight line movement and prevented from rotating on a fixed axial rod (76) which extends axially beyond, and in extension of, the threaded rod (32).

23. Apparatus according to claim 19, wherein the actuator (34) is coupled to said at least one cam (30) and to the output shaft (12) through an epicyclic gear train.

24. Apparatus according to claim 19, wherein the actuator (34) is coupled to said at least one cam (30) and to the output shaft (12) through a double epicyclic gear train.

25. Apparatus according to claim 14, wherein the actuator (34) is located remotely and is coupled to said at least one cam (30) through a synchronous transmission (74).

26. Apparatus according to claim 1, wherein the one-way lock-up mechanisms (28) for the free pinion are mounted axially on either side of said free pinion (26).

27. Apparatus according to claim 1, wherein the two one-way lock-up mechanisms (28) for the free pinion (26) are mounted axially both on the same side of said free pinion.

28. Apparatus according to claim 1, further comprising a reverse gear pinion mounted on the input shaft (18) that carries the driving pinion (22) for the first transmission ratio, an intermediate pinion in engagement with the reverse gear pinion and with the driven pinion mounted on the output shaft (12), and controlled means for coupling the reverse gear pinion with the input shaft (18) or for coupling the driven pinion with the output shaft (12).

29. Apparatus according to claim 28, wherein the reverse gear pinion is one of those for the transmission ratios of which the driving pinions are mounted on the second input shaft (20).

30. Apparatus according to claim 1, wherein each clutch (E1, E2) is a dry clutch.

31. Apparatus according to claim 3, wherein one said clutch (E1) is a dry clutch on the outside of a casing (62) containing said pinions (22, 24, 26), while the other said clutch (E2) is a multidisc clutch in oil, mounted inside said casing (62).

* * * * *